United States Patent
Klukowski

(10) Patent No.: US 8,435,124 B2
(45) Date of Patent: May 7, 2013

(54) VARIABLE LENGTH STEERING SPINDLE

(75) Inventor: Christoph Klukowski, Walenstadt (CH)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 972 days.

(21) Appl. No.: 12/458,319

(22) Filed: Jul. 8, 2009

(65) Prior Publication Data

US 2009/0272220 A1 Nov. 5, 2009

Related U.S. Application Data

(63) Continuation of application No. PCT/EP2007/011309, filed on Dec. 21, 2007.

(30) Foreign Application Priority Data

Jan. 10, 2007 (DE) .......... 10 2007 002 380

(51) Int. Cl.
*F16C 3/035* (2006.01)
*F16D 3/06* (2006.01)

(52) U.S. Cl.
USPC ............... 464/167; 384/25; 384/49

(58) Field of Classification Search ........... 464/162, 464/167, 179; 384/25, 26, 29, 42, 46, 49, 384/50, 51, 52, 53, 55
See application file for complete search history.

(56) References Cited

U.S. PATENT DOCUMENTS

| | | | | |
|---|---|---|---|---|
| 4,075,872 A | * | 2/1978 | Geisthoff | 464/167 |
| 4,705,491 A | * | 11/1987 | Andersson | 464/167 |
| 4,898,566 A | * | 2/1990 | Hakansson | 464/167 |
| 5,584,765 A | * | 12/1996 | Ochiai | |
| 6,149,526 A | | 11/2000 | Boersma et al. | |
| 6,200,225 B1 | * | 3/2001 | Hobaugh, II | 464/167 |
| 6,350,203 B1 | * | 2/2002 | Zernickel | 464/167 |

(Continued)

FOREIGN PATENT DOCUMENTS

| | | |
|---|---|---|
| DE | 37 30 393 | 3/1989 |
| DE | 198 24 477 | 12/1999 |
| DE | 101 23 413 | 12/2002 |
| EP | 1 070 865 | 1/2001 |
| EP | 1 065 397 | 4/2006 |
| EP | 1 652 748 | 5/2006 |
| GB | 1 207 410 | 9/1970 |

OTHER PUBLICATIONS

International Search Report issued Apr. 21, 2008 in the International (PCT) Application of which the present application is the U.S. National Stage.

*Primary Examiner* — Gregory Binda
*Assistant Examiner* — Matthieu Setliff
(74) *Attorney, Agent, or Firm* — Wenderoth, Lind & Ponack, L.L.P.

(57) ABSTRACT

A variable length steering spindle for a steering mechanism of a motor vehicle includes an outer sleeve, an inner member, a slide sleeve having recesses, and rolling bodies. The recesses and the rolling bodies are configured such that the rolling bodies project from the slide sleeve in a no-load state of the slide sleeve, and in an assembled state of the steering spindle the rolling bodies are prestressed against a raceway face and are displaced in a direction away from the raceway face against a reset force. The slide sleeve contacts the other of the outer sleeve and the inner member when a limit value of torque is exceeded. The rolling bodies are non-displaceable in the longitudinal direction with respect to the slide sleeve or are finitely displaceable between stops formed at distal ends of the recesses.

16 Claims, 7 Drawing Sheets

U.S. PATENT DOCUMENTS

| | | | |
|---|---|---|---|
| 6,474,868 B2 * | 11/2002 | Geyer et al. | 464/167 X |
| 6,921,338 B2 * | 7/2005 | Cermak et al. | 464/167 |
| 7,753,800 B2 * | 7/2010 | Tokioka et al. | 464/167 |
| 2006/0269177 A1 * | 11/2006 | Zernickel | |

* cited by examiner

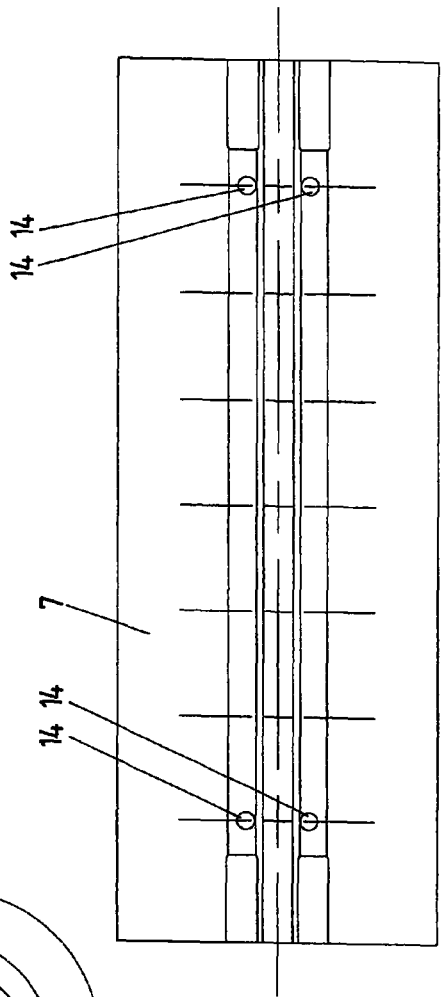
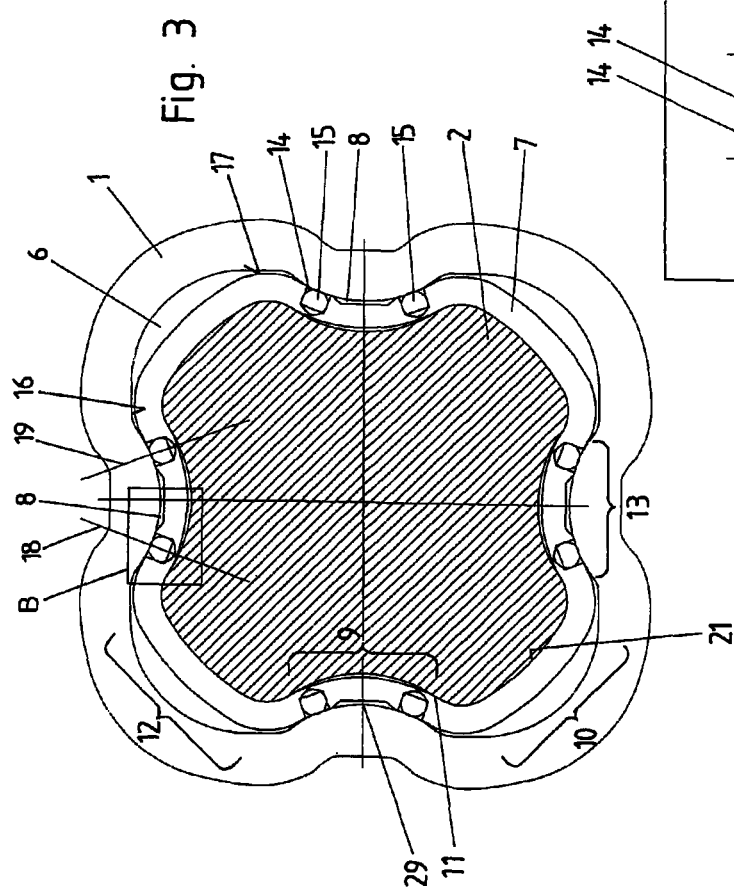

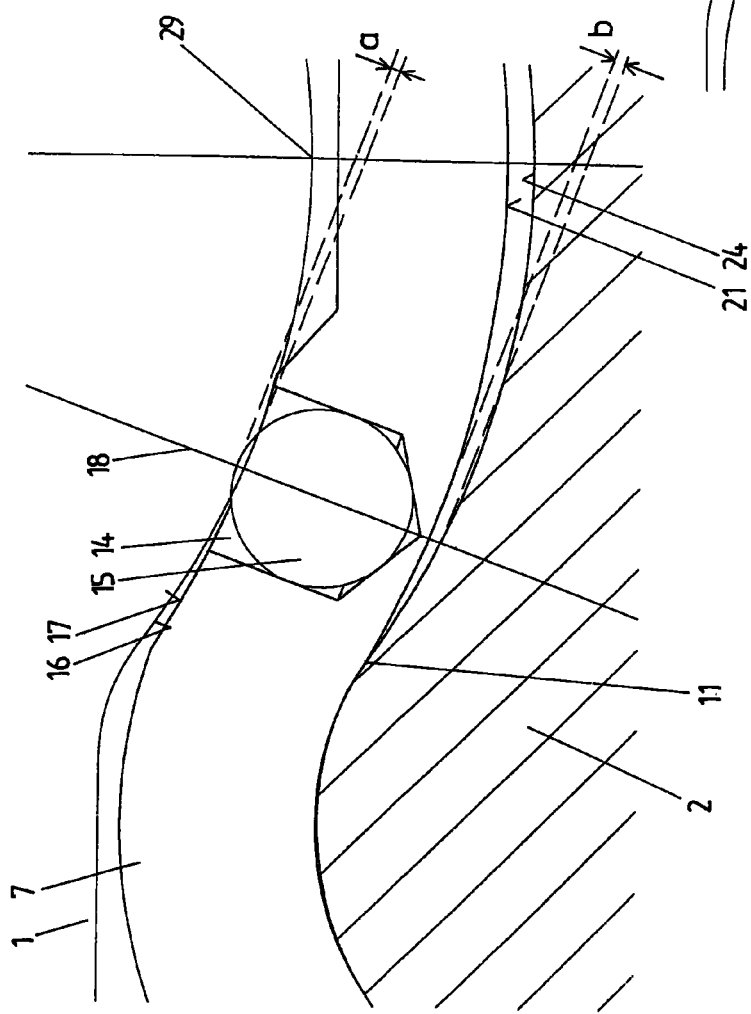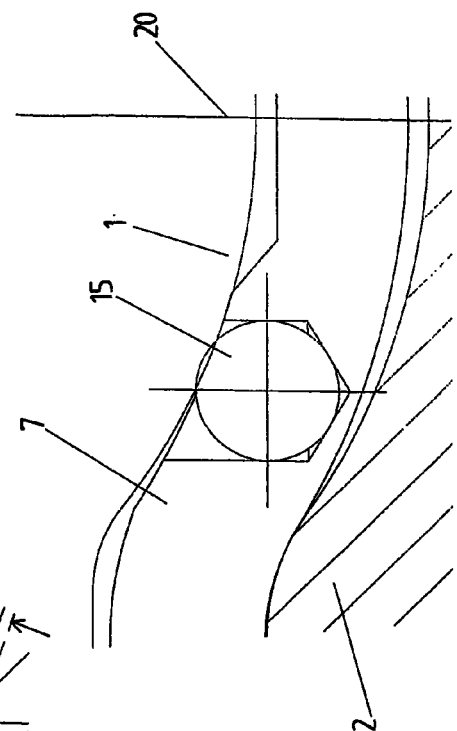

VARIABLE LENGTH STEERING SPINDLE

This application is a continuation application of International application PCT/EP2007/011309, filed Dec. 21, 2007, the entire disclosure of which is incorporated herein by reference.

BACKGROUND OF THE INVENTION a) Field of the Invention

The invention relates to a variable length steering spindle for steering mechanisms of motor vehicle. The steering spindle including an outer sleeve-form profile with a cross section departing from the circular form, and an inner profile with a cross section departing from the circular form, which can be slid with an end section into the outer profile, wherein the inner circumferential contour of the outer profile. The outer circumferential contour of the inner profile are formed at least partially by arcuate sections and, toward the gap space between the outer profile and the inner profile, these arcuate sections form preferably alternately convex and concave sections of the outer profile as well as also of the inner profile. The convex sections of the outer profile are disposed at least partially opposite the concave sections of the inner profile, and/or the concave sections of the outer profile are disposed at least partially opposite the convex sections of the inner profile. The spindle also included a slide sleeve disposed in the gap space, which sleeve is held with respect to one of the two profiles torsion-tight and nondisplaceable in the longitudinal direction and which, together with the profile holding the slide sleeve, is displaceable with respect to the other profile in the longitudinal direction, however, is substantially torsion-tight.

b) Description of Related Prior Art

Such a variable length steering spindle is disclosed in U.S. Pat. No. 6,149,526 A. The slide sleeve disposed in the gap space between the inner and the outer profile is along its circumferential contours only sectionwise and alternately in contact on the walls of the profile delimiting the gap space. It is alternately in contact on convex sections of the inner profile and on concave sections of the outer profile. Herein the play necessarily present between the parts is compensated, wherein upon a rotational movement of the steering wheel a steering resistance sets in that is virtually free of play. The necessarily present play is no longer perceived as such by the motor vehicle driver actuating the steering since the slide sleeve is prestressed with respect to the outer profile. Nevertheless, the values predetermined for the axial displaceability of the profiles can be reliably maintained over a longer period of time. One disadvantage of this construction is that with progressive decrease of the tolerated actual play between the inner and the outer profile, which is desirable in practice, the so-called "slip-stick motion" may occur between the slide sleeve and the profile displaceable with respect to it. The sliding during a longitudinal displacement is thus no longer continuous but rather a rattling movement results, which can be perceived on the steering wheel and can also lead to undesirable noise. Such a slip-stick can occur not only during a length adjustment of the steering column but also with vehicle distortion when driving through curves.

In addition to slide guidings between steering spindle parts, thrust guides with rolling bodies acting between the shaft parts are also disclosed, for example in DE 37 30 393 C2, DE 101 23 413 A1, DE 198 24 477 A1, EP 1 652 748 and EP 1 065 397. Via these rolling bodies, the torques acting between the steering spindle parts must also be transmitted. In order to be able to also absorb high steering forces, these constructions are complex with respect to the development of the raceways for the rolling bodies and appropriate numbers and sizes of rolling bodies must also be employed, which must work nearly free of play. To some extent are also provided elements resiliently supporting the rolling bodies with respect to the one profile, which elements prestress the rolling bodies against the other profile.

EP 1 070 865 A2 discloses a linear roller bearing, which is not of the same class, for the transmission of torques, which bearing is developed with continuous ball raceways. The continuous ball raceways are developed in a cage disposed between the outer and the inner profile. For the playfree prestress of the profiles against one another, a prestress means acting onto the balls is provided which is formed in particular by a raceway section located in the load zone and formed spring-resiliently on one of the oppositely located wall sections of the profiles. When introducing a torque acting between the profiles, the wall section can spring-in so far that the oppositely located wall sections of the profiles move toward one another until they come into contact or clamp in a section of the cage located between them. Of disadvantage in this device is inter alia the implementation, which is complex due to the continuous ball raceways. In this construction it is also not readily possible to attain a very small overall play between the inner and the outer profile until the wall sections associated with one another are in contact with one another or clamp a section of the cage between them, and in such a load case the displaceable guidance between the inner and the outer profile is restricted.

SUMMARY OF THE INVENTION

The invention addresses the problem of providing a variable length steering spindle of the type described in the introduction, in which, at very small overall play of the twistability between the inner and the outer profile, a smooth length adjustability is attained.

According to the invention, this object is achieved through a variable length steering spindle for steering mechanisms of motor vehicles, comprising an outer sleeve-form profile with a cross section departing from the circular form, an inner profile with a cross section departing from the circular form, which can be slid with an end section into the outer profile. The inner circumferential contour of the outer profile and the outer circumferential contour of the inner profile are at least partially formed by arcuate sections and these arcuate sections, toward the gap space between the outer profile and the inner profile, form preferably alternately convex and concave sections of the outer profile as well as of the inner profile. The convex sections of the outer profile are at least partially opposite the concave sections of the inner profile and/or the concave sections of the outer profile are at least partially opposite the convex sections of the inner profile. A slide sleeve disposed in the gap space, which is held such that it is torsion-tight with respect to one of the two profiles and nondisplaceable in the longitudinal direction and which, together with the profile holding the slide sleeve, is displaceable with respect to the other profile in the longitudinal direction, however, substantially torsion-tight. In recesses of the slide sleeve rolling bodies are disposed, which on the side of the slide sleeve on which is located in the assembled state the profile that is longitudinally displaceable with respect to the slide sleeve, project at least in their no-load state from the slide sleeve and which, in the mounted condition of the steering spindle, are each prestressed against a surface forming a raceway face of the profile that is longitudinally displaceable with respect to the slide sleeve, and which are displaceable against a reset force into a direction away from the raceway face. When a limit value has been exceeded of the torque acting between the two profiles, contact occurs between the surface of the slide sleeve and the surface of the profile that is longitudinally displaceable with respect to it.

According to the invention, thus, in a variable length steering spindle of the type described in the introduction, rolling bodies are disposed in recesses of the slide sleeve. In their no-load condition these project therefrom in any case on that side of the slide sleeve on which is located the profile that is longitudinally displaceable with respect to the slide sleeve. In the assembled state of the steering spindle, each of these rolling bodies is in contact on a surface of this longitudinally displaceable profile, which forms a raceway face for the particular rolling bodies and, with respect to which, the particular rolling body is prestressed. The rolling bodies can each be pressed against a reset force into a direction directed away from the particular raceway face, wherein, if a limit value of the torque acting between the profiles is exceeded, contact occurs between the surface of the slide sleeve and the profile displaceable with respect to it. High active torques are thus transmitted directly between the longitudinally displaceable profile and the slide sleeve, such that the loading of the raceways and the rolling bodies is limited. Without active torques or in the presence of low torques, the rolling bodies counteract a slip-stick, since they (again), with their projecting-out of the slide sleeve, enforce minimal play between the slide parts. At high active torques a reliable and yet relatively low-friction force transmission between the displaceable profile and the slide sleeve is attained. In practice at such high torques, for example, during parking, problems with slip-stick occur generally less often. A variable length steering spindle according to the invention can be developed with very low overall play of the torsion between the inner and the outer profile, which, moreover, is not perceived as such by the driver. The profile holding the slide sleeve such that it is nondisplaceable in the longitudinal direction is, consequently, displaceable in the longitudinal direction with respect to the other profile, however, is substantially torsion-tight (only with minimal play for longitudinal displaceability).

In an advantageous embodiment variant of the invention, the rolling bodies are rotatably disposed in the recesses such that they are nondisplaceable in the longitudinal direction of the slide sleeve. A limited longitudinal displaceability of the rolling bodies in the recesses between stops, formed by the longitudinal ends of the recesses, is also conceivable and feasible.

The rolling bodies are preferably formed by spheres. The recesses in the slide sleeve can herein be formed by pocket bores with circular cross section or by elongated hole-shaped indentations, wherein the spheres are in contact on the bottom of the particular recess. When a rolling body is pressed in against the bottom, the material of the slide sleeve effects a reset force which also effects the prestress against the longitudinally displaceable profile. The slide sleeve is preferably comprised of a synthetic material. The recess accepting a particular sphere can further also extend through the synthetic material of the slide sleeve. In this case, on or in the synthetic material of the slide sleeve spring-resilient elements can be secured, which form the bottom of the particular recess. Spring-resilient elements, against which the spheres in the recesses can be pressed in, can furthermore also be placed between the slide sleeve and the profile holding the slide sleeve nondisplaceably in the longitudinal direction or they can be secured on or in this profile. These spring-resilient elements can, at least on their contact side for the particular rolling body, be provided with a slide layer or a slide material.

In all of these embodiment variants, instead of spheres, rolling bodies developed differently, for example in the shape of cylinders, can in principle also be utilized.

The slide sleeve is preferably implemented integrally and closed along its circumference and in this manner encompasses the inner profile.

In an advantageous embodiment of the invention, the slide sleeve in convex sections, viewed from the direction of the gap space, of the circumferential contour of the profile bearing it is in contact on this profile and, in the interspaced concave sections of the circumferential contour of the profile bearing them, is spaced apart from this profile. In the convex section, viewed from the direction of the gap space, located opposite these concave sections of the circumferential contour of the profile longitudinally displaceable with respect to the slide sleeve, are located the raceways for the rolling bodies. In the region of the concave sections, viewed from the direction of the gap space, located opposite the convex sections of the profile bearing the slide sleeve, of the profile longitudinally displaceable with respect to the slide sleeve, the slide sleeve is spaced apart from this profile.

An advantageous embodiment of the invention provides that all rolling bodies are spaced apart from that profile on which the slide sleeve is held such that it is nondisplaceable in the longitudinal direction, and specifically in the absence of an active torque as well as also in the presence of an active torque, and specifically at a value of this torque below the limit value at which the force transmission takes place directly between the longitudinally displaceable profile and the slide sleeve, as well as also at a torque above this limit value. The distance can herein be at least partially formed by an air gap or it is overall bridged by a part that, even above the limit value, has resiliency for the particular rolling body, for example by a spring-resilient element or the material of the slide sleeve.

BRIEF DESCRIPTION OF THE DRAWINGS

Further advantages and specifics of the invention will be explained in the following in conjunction with the enclosed drawings, in which

FIG. 3 is a cross section along line A-A of FIG. 2;

FIG. 4 shows the slide sleeve in perspective view (without emplaced rolling bodies);

FIG. 5 shows an enlarged segment B from FIG. 3;

FIG. 6 shows a modified embodiment of a steering spindle according to the invention, in a representation analogous to FIG. 5;

The figures are drawn to different scales.

DETAILED DESCRIPTION OF THE PREFERRED EMBODIMENTS

A first embodiment of the invention is depicted in FIGS. 1 to 5. The steering spindle comprises in its depicted section, essential to the invention, of its longitudinal dimension an outer sleeve-form profile 1 (i.e. an outer sleeve) and an inner profile 2 (i.e. an inner member) that projects with an end section into the outer profile 1 and that is displaceable with respect to the latter in the direction of the central longitudinal axis 3 of the steering spindle, thus in the longitudinal direction of the steering spindle.

Figure 1:
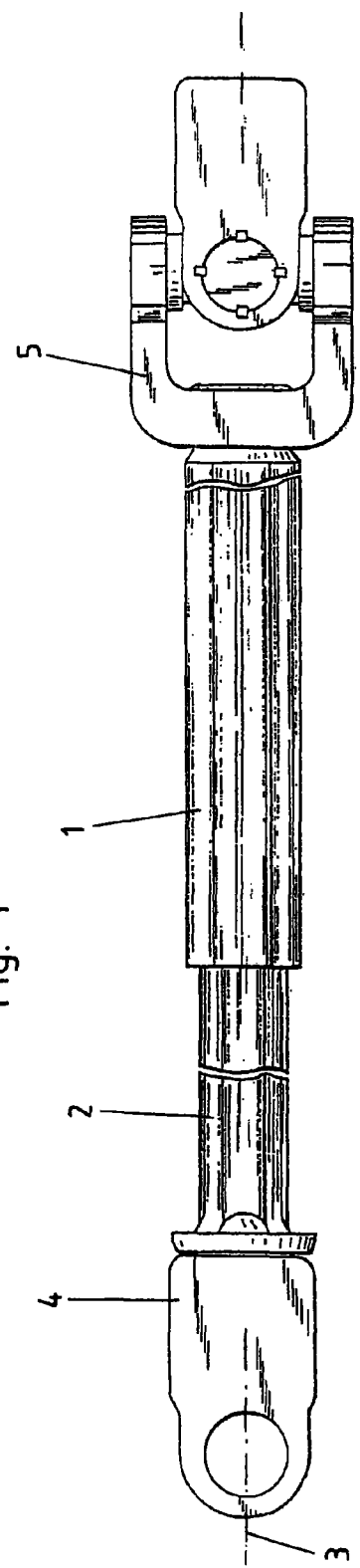
FIG. 1 is a view of a steering spindle according to the invention in the section of the telescopable profiles.
Figure 2:
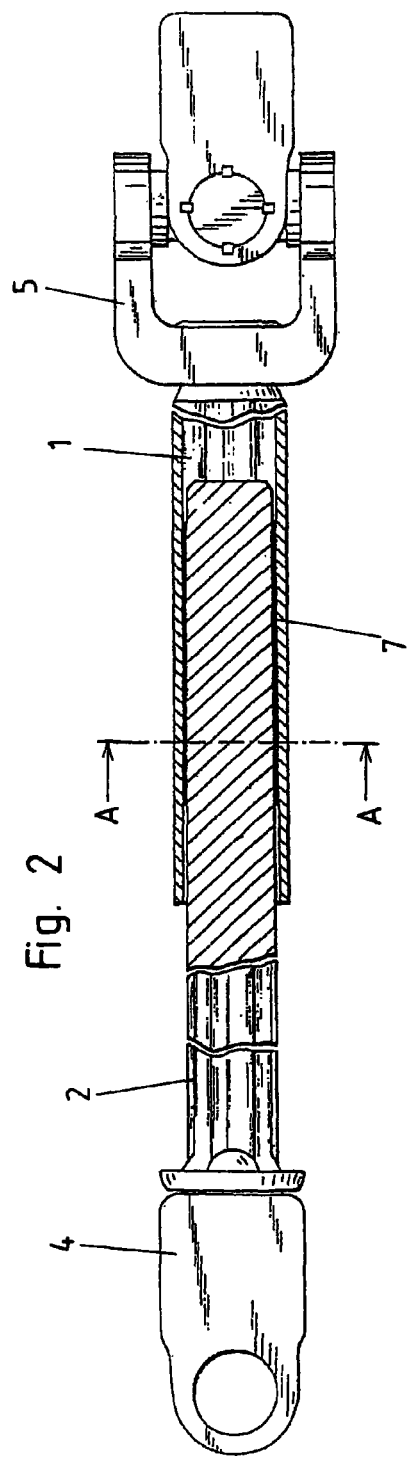
FIG. 2 shows the steering spindle according to FIG. 1, partially in longitudinal section.

As shown, the inner profile 2 can be comprised of solid material. A sleeve-form formation is also conceivable and feasible. The outer profile 1 could also have a solid section aside from the hollow volume into which projects the inner profile 2. In FIGS. 1 and 2 formed pieces 4, 5 are disposed on the ends of the profiles 1, 2 remote from one another, which pieces are connected with other parts of the steering mechanism not essential to the invention.

The profiles 1, 2 have cross sections (cf. FIG. 3) departing from the circular form. The inner circumferential contour of the outer profile 1 and the outer circumferential contour of the inner profile 2 are herein, at least to some extent, formed by arcuate sections, wherein the radii of curvature of these arcuate sections along a particular circumferential contour are alternately within and outside of a particular profile. The outer circumferential contour of the inner profile 1 and the inner circumferential contour of the outer profile 2 are developed at least sectionwise and approximately correspondingly to one another.

Viewed from the direction of a gap space 6 located between the profiles 1, 2, by these arcuate sections of the circumferential contours of the profiles 1, 2 alternately in each case convex and concave zones or sections 9, 10 and 12, 13 of profiles 1, 2, respectively, are formed. The convex sections 13 of the outer profile 1 are herein located substantially opposite the concave sections 9 of the inner profile 2 and the concave sections 12 of the outer profile 1 are located substantially opposite the convex sections 10 of the inner profile 2.

In the depicted embodiment, the inner circumferential contour of the outer profile and the outer circumferential contour of the inner profile are formed substantially only by arcuate sections. It would, in principle, also be conceivable and feasible to provide straight sections between arcuate sections of the inner circumferential contour of the outer profile 1 and/or between arcuate sections of the outer circumferential contour of the inner profile 2.

The inner dimensions of the outer profile 1 and the outer dimensions of the inner profile 2 differ in so far that between these two profiles 1, 2 a not inconsiderable play is present. Consequently, an encompassing gap space 6 is formed which, in the depicted embodiment example, has a varying width along its circumference. It would also be conceivable and feasible for the gap space 6 to be of constant width along its circumference.

In the gap space 6, a slide sleeve 7 is disposed that is circumferentially closed, which to some extent bridges the play or the gap between the outer profile 1 and the inner profile 2 and which in the depicted embodiment is held on the inner profile 2 nondisplaceably in the longitudinal direction of the inner profile 2. For this purpose, for example bilaterally to the longitudinal ends of the slide sleeve 7, projections could be disposed on the inner profile 2.

With respect to its circumferential contour, at least in the assembled state, the slide sleeve 7 corresponds over the major portion of its circumference to the circumferential contour of the profile 2 bearing it. After the slide sleeve 7 has been properly assembled, the circumferential contour can minimally depart from the contour it had in the non-installed state. Through the installation, the slide sleeve 7 is subsequently minimally deformed and is thereby prestressed. In the assembled state the slide sleeve 7 is torsion-tight with respect to the profile 2 bearing it.

In the depicted embodiment, the wall thickness of the slide sleeve 7 is substantially constant over its circumference. Only in the proximity of longitudinally extending grooves 8 is its wall thickness minimally decreased in the embodiment. It would also be conceivable and feasible to provide a slide sleeve with a wall thickness varying over its circumference.

Figure 15:
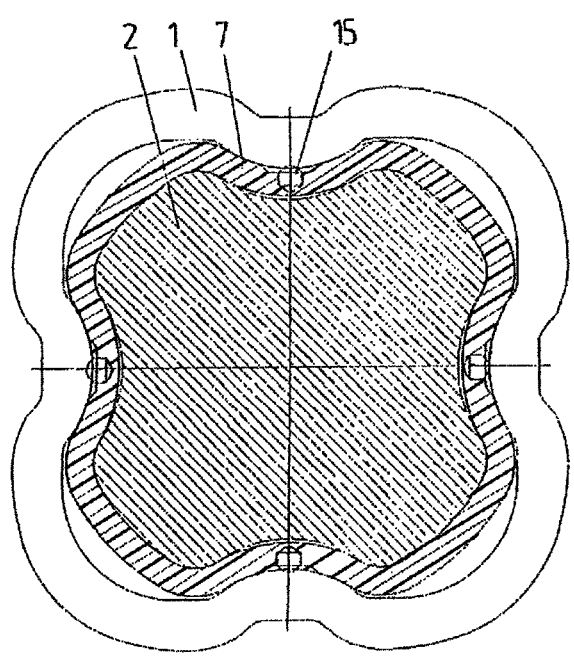
FIG. 15 shows a cross section of a tenth embodiment of the invention.

The slide sleeve 7 is comprised of a synthetic material, as shown in FIG. 15. The synthetic material is preferably a macromolecular material and is capable of sliding. In the favorable case, as low a coefficient of friction as is possible should be attained between the slide sleeve and the profile 1, longitudinally displaceable with respect to it, however, also with respect to the rolling bodies 15 explained in further detail below.

In the depicted embodiment, the slide sleeve 7 is in contact on the sections 10, that are convex toward the gap space 6, of the outer circumferential contour of the inner profile 2, cf. FIG. 3. In the interspaced sections 9, that are concave toward the gap space 6, of the outer circumferential contour of inner profile 2, the slide sleeve 7 is spaced apart from this profile 2. Between each of the sections 9 and 10 there is located a transition point 11. In the sections 12, which are concave toward the gap space 6, of the inner circumferential contour of the outer profile 1, the slide sleeve 7 is spaced apart from the outer profile 1. In sections 13, located in between and convex toward the gap space 6, of the inner circumferential contour of the outer profile 1 is carried out the longitudinal guidance between slide sleeve 7 and outer profile 1.

The slide sleeve 7 includes recesses 14, which in this embodiment are developed in the form of pocket holes extending from the outer surface 17 of slide sleeve 7. In the recesses 14 rolling bodies 15 formed by spheres are disposed such that they are rotatable with small play.

In FIGS. 3 and 5 is shown (and also in the sectional representations described below regarding other embodiments of the invention) that condition of the slide sleeve 7 with the rolling bodies 15 disposed in their recesses 14 which would be assumed not to have an outer profile 1 slid on. The rolling bodies 15 project by a measure beyond their recesses 14 and are shown as projecting into the volume assumed by outer profile 1. In the assembled state of the steering spindle, the rolling bodies 15 are thus displaced in the direction toward the inner profile 2 when the outer profile 1 is slid on, wherein the slide sleeve 7 becomes sectionwise deformed. Hereby a centering prestress force of the rolling bodies 15 against the inner surface 16 of the outer profile 1 is developed. The regions in which the rolling bodies 15 are in contact on the inner surface 16 of the outer profile 1 represent raceways for the rolling bodies 15 extending in the longitudinal direction of the steering spindle.

By interspacing the slide sleeve 7 with the rolling bodies 15, rotatably supported axis-free in it, the profiles 1, 2, i.e. apart from a remaining play that is non-perceptible to the driver due to the prestress force acting onto the rolling bodies 15, are torsion-tight with respect to one another.

In the embodiment according to FIG. 1 to 5, the distance b of the slide sleeve 7 from the inner profile 2 is minimally greater than the protrusion a of the rolling body 15.

If there is a torque acting between profiles 1, 2, the rolling bodies 15, as a function of the magnitude of this torque, through the force exerted onto the rolling bodies by the profile displaceable with respect to the slide sleeve 7, are displaced still further in the direction toward the inner profile 2, and specifically against the reset force of the material of the slide sleeve 7. With increasing torque, contact of the inner surface 16 of the outer profile 1 on the outer surface 17 of slide sleeve 7 occurs starting at a limit value of the torque. Starting from this limit value of the torque, longitudinal displacement of the outer profile 1 with respect to the slide sleeve 7 takes place via the kinetic friction between these two parts.

In the embodiment-according to FIG. 1 to 5 on both sides of an apex 29 of the convex section 13 of the inner circumferential contour of the outer profile 1, spaced apart equidistantly from such apex, two recesses 14 extend, spaced apart from one another in the longitudinal direction of the slide sleeve 7, with rolling bodies 15 disposed therein. More than two recesses 14 spaced apart in the longitudinal direction with rolling bodies 15 or only a single recess 14 with one or several rolling bodies 15 on each side of the apex 29 could also be provided. Bilaterally to a particular apex 29 could also be provided two or more recesses 14, spaced apart in the circumferential direction, with rolling bodies 15 disposed therein.

Without an active torque between profiles 1, 2, through the prestress force of the resiliently bedded rolling bodies 15, by these bodies a force is exerted onto the profile 1 that is longitudinally displaceable with respect to the slide sleeve 7, which force acts in terms of a centering of this profile 1 longitudinally displaceable with respect to the other profile 2. This centering action relates, for one, to the orientation of the longitudinal axes of the two profiles as well as also the angular position of the two profiles, i.e. a force acting in the direction of a neutral position (=center position) is exerted. This force, consequently, acts in the sense of a formation of—apart from the contact sites of the rolling bodies 15—an encompassing gap between slide sleeve 7 and profile 1 which, with respect to such slide sleeve, is longitudinally displaceable.

In the embodiment according to FIG. 1 to 5, the axes 18, 19 of the spherical recesses 14 are at right angles to the wall of the slide sleeve 7 in the proximity of a particular recess 14 and form with one another an angle of, for example, 40°.

FIG. 6 depicts an embodiment variant, in which the axes 18, 19 of recesses 14 are approximately parallel to the normal 20 on the slide sleeve 7 which penetrates the slide sleeve 7 in the proximity of the apex of the convex section 13. It differs from the previously described embodiment example in that in the production of the slide sleeve 7 the latter's ejection from the mold is more readily facilitated.

Figure 7:
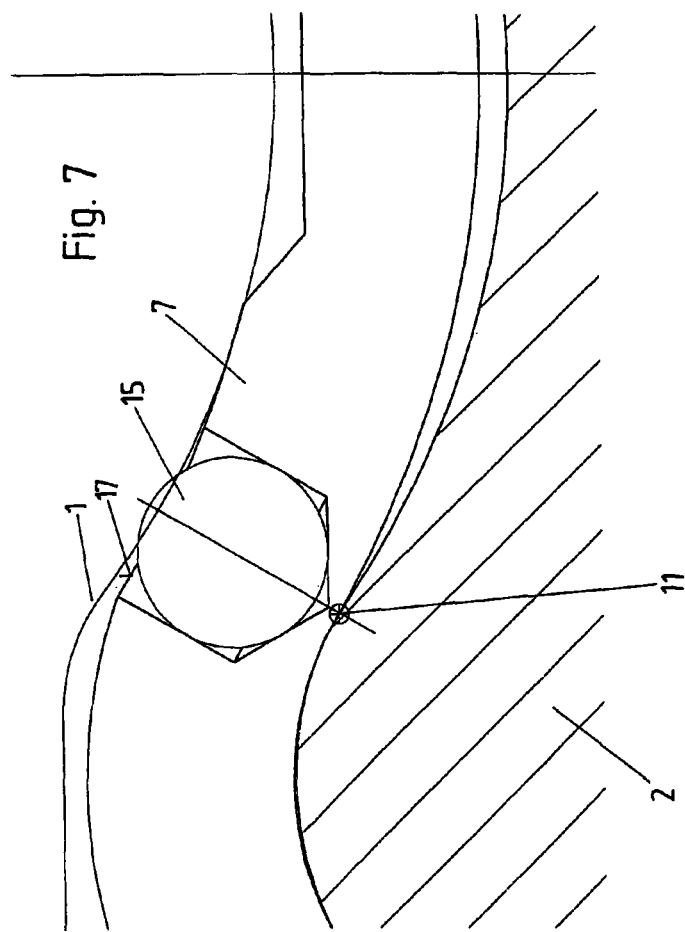
FIG. 7 shows a further modified embodiment.

FIG. 7 depicts a further embodiment in which the axes of recesses 14 extend through the transition points 11. It differs from the previously described embodiment in that a flowing of the material of the slide sleeve 7 occurs when a particular rolling bodies 15 are pressed in in the direction toward the inner profile 2. The synthetic material of the slide sleeve 7 through its tendency to return at least largely to its original form, exerts a reset force onto the rolling bodies 15 (="resilient creep" or "memory effect" of the material of the slide sleeve 7).

Figure 8:
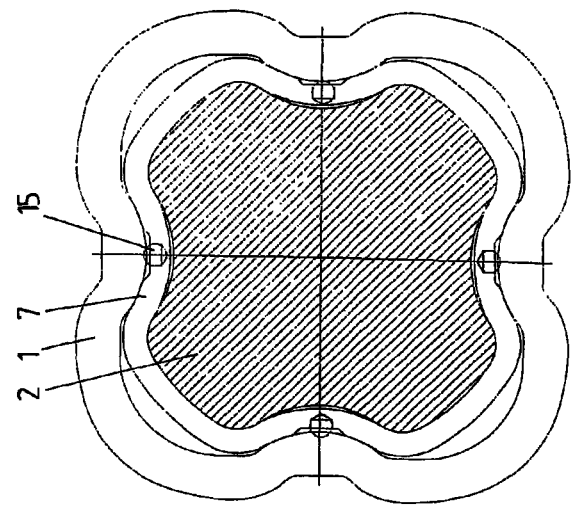
FIG. 8 shows a cross section analogous to FIG. 3 of a fourth embodiment of the invention.
Figure 9:
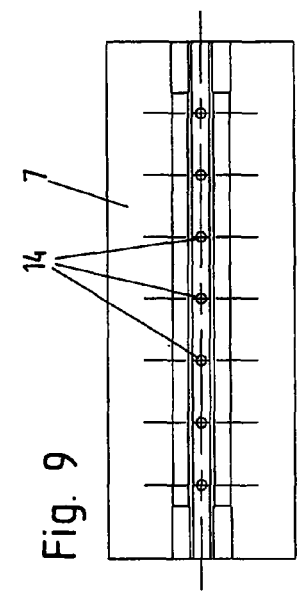
FIG. 9 is a view of the slide sleeve (without rolling bodies) according to this fourth embodiment of the invention.

In the case of the embodiment depicted in FIGS. 8 and 9, the rolling bodies are each disposed in the proximity of an apex 29 of a convex section 13 of the inner circumferential contour of outer profile 1, i.e. the raceways of the rolling bodies 15 extend along the crests comprising the apex points. For example, in the longitudinal direction of the slide sleeve 7 for each crest more than two rolling bodies 15 are provided, cf. the row evident in FIG. 9 of recesses 14. Through the rolling bodies 15 prestressed with the respect to the profile 1, longitudinally displaceable with respect to the slide sleeve 7, here at least a centering action with respect to the coaxial orientation of the longitudinal axes of both profiles 1, 2 and the slide sleeve 7 is effected.

Figure 10:
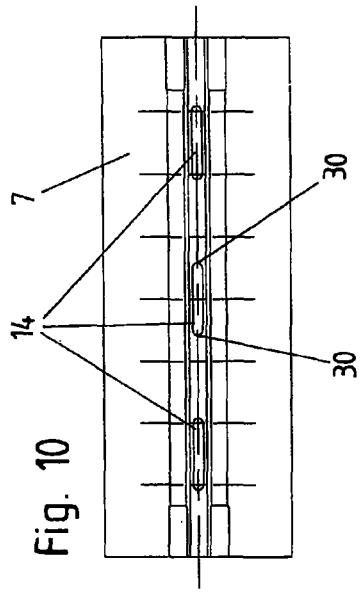
FIG. 10 is a further embodiment of the slide sleeve in a view (without rolling bodies)

Instead of a retention of the rolling bodies 15 nondisplaceable in the longitudinal direction of the slide sleeve 7, these could also be finitely displaceable in the longitudinal direction. Appropriate elongated hole-shaped recesses 14 in the slide sleeve 7 are evident in FIG. 10. The longitudinal ends of a particular recess 14 form stops 30 for limiting the longitudinal displacement of the rolling body 15 disposed therein. The particular rolling body 15 acts here onto the length of the elongated hole with a pure rolling friction with respect to the slide sleeve 7.

In at least some or all recesses 14, more than one rolling body 15 could also be disposed.

Recesses 14 could also have in the opening region toward the outer surface 17 constrictions or inwardly projecting lips in order to secure the rolling bodies 15 against falling out of the recesses 14.

Figure 11:
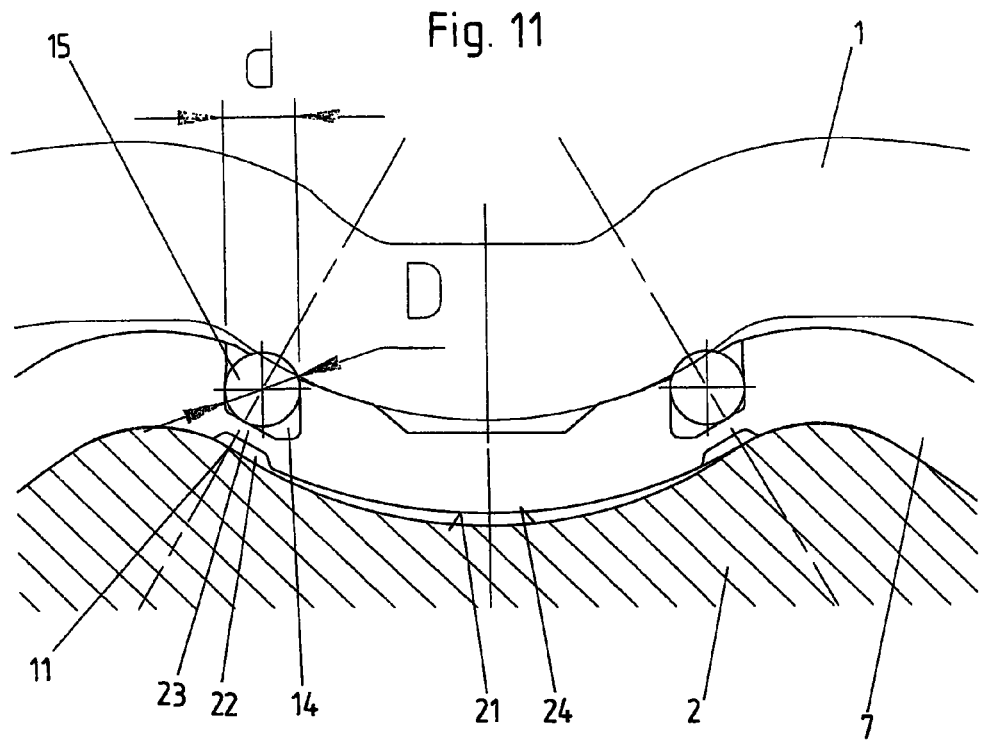
FIG. 11 shows a portion of a cross section through a steering spindle according to a sixth embodiment of the invention.

A further embodiment variant is depicted in FIG. 11. For a resilient bedding of the rolling bodies 15, here in the proximity of the recesses 14, extending from the inner surface 21 of slide sleeve 7, indentations 22 are disposed whereby resilient relief clearance of the bottom 23 of recess 14 with respect to the outer surface 24 of inner profile 2 is attained.

In the opening region of a particular recess 14 toward the outer surface 17 this recess narrows again to a diameter d which is smaller than the diameter D of the rolling body 15 disposed rotatably therein, in order to secure the latter against falling out.

The bottom 23 could also be formed such that it is vaulted in the direction toward the outer profile 1.

Bottom 23 could further be provided with a gap extending, for example, about a portion of the circumference of bottom 23 in order to form a spring arm for the resilient bedding of the rolling body 15. The gap could, for example, extend over more than one half of the outer circumference of bottom 23. Instead of a gap, which thus extends through the bottom 23, a thinning of the bottom 23 could be provided.

Figure 12:
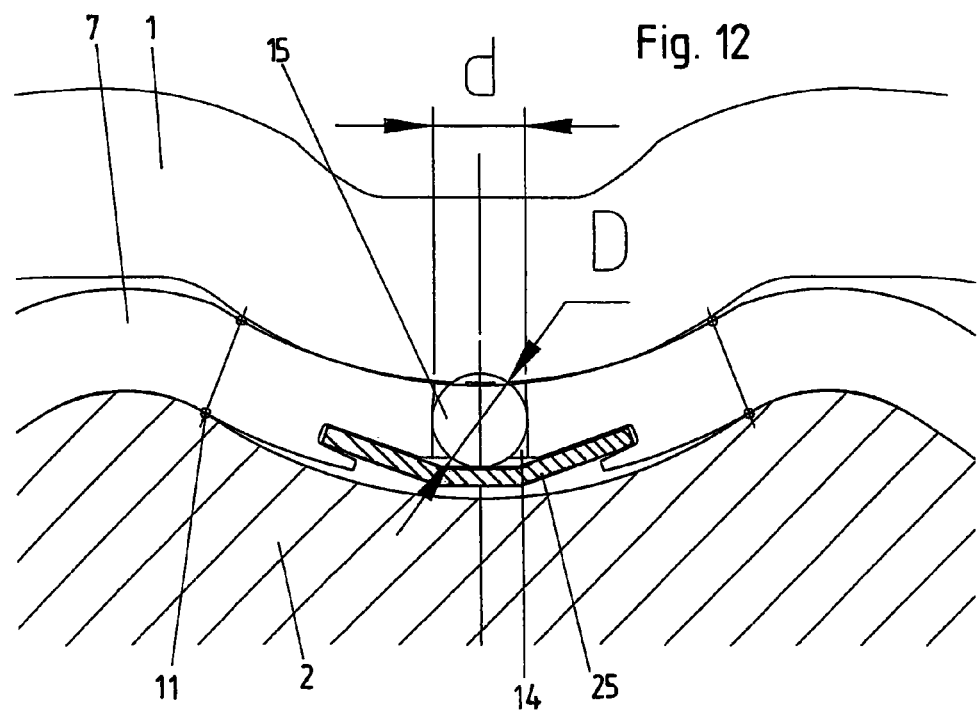
FIG. 12 shows a portion of a cross section through a steering spindle according to a seventh embodiment.

A further embodiment is depicted in FIG. 12. Recess 14 for a particular rolling body 15 here penetrates the synthetic material of slide sleeve 7. The bottom of recess 14 is formed by a resilient element 25 which is anchored in the material of slide sleeve 7. In this way, again is attained the resilient bedding for the particular rolling body 15. Recess 14 in the proximity of its opening toward the outer surface 17 can again be constricted (diameter d) in order to secure the rolling body 15 (diameter D) against falling out.

The retention of a resilient element in or on the material of slide sleeve 7 can also take place in a manner different from that shown.

Figure 13:
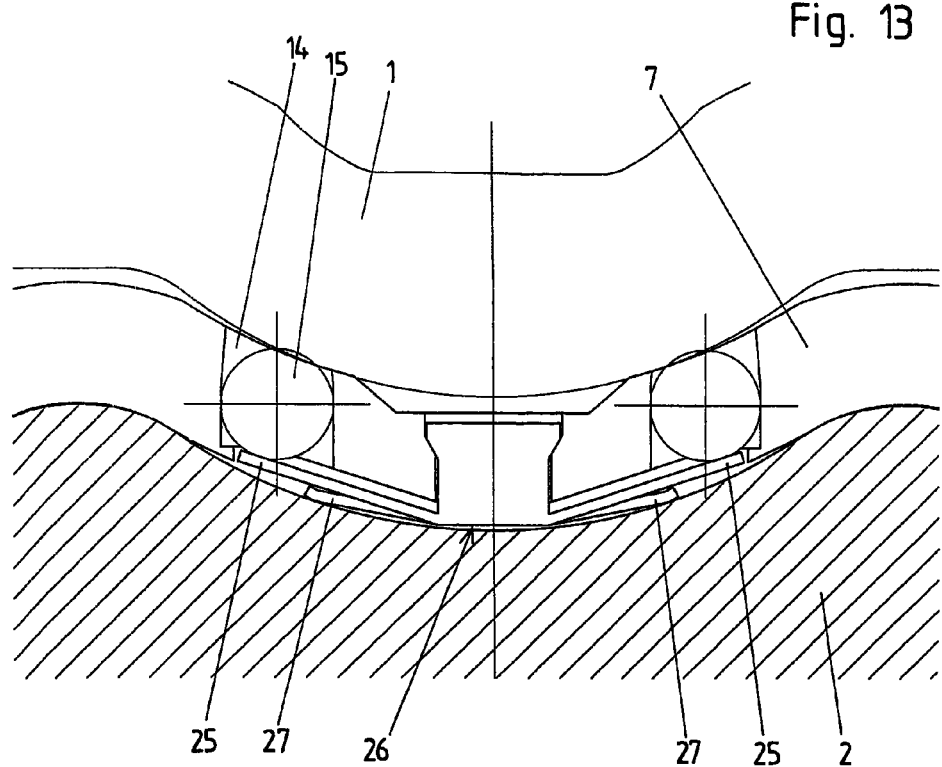
FIG. 13 shows a portion of a cross section through a steering spindle according to an eighth embodiment.

In the embodiment according to FIG. 13, the bottom of a particular recess 14 is again formed by a resilient element 25. This element represents here a spring arm of a spring-resilient insert part 26, which is depicted clipped into the slide sleeve 7. Spaced apart in the longitudinal direction from the particular resilient element 25 is provided at least one further spring arm 27, which is stayed on the inner profile 2.

Figure 14:
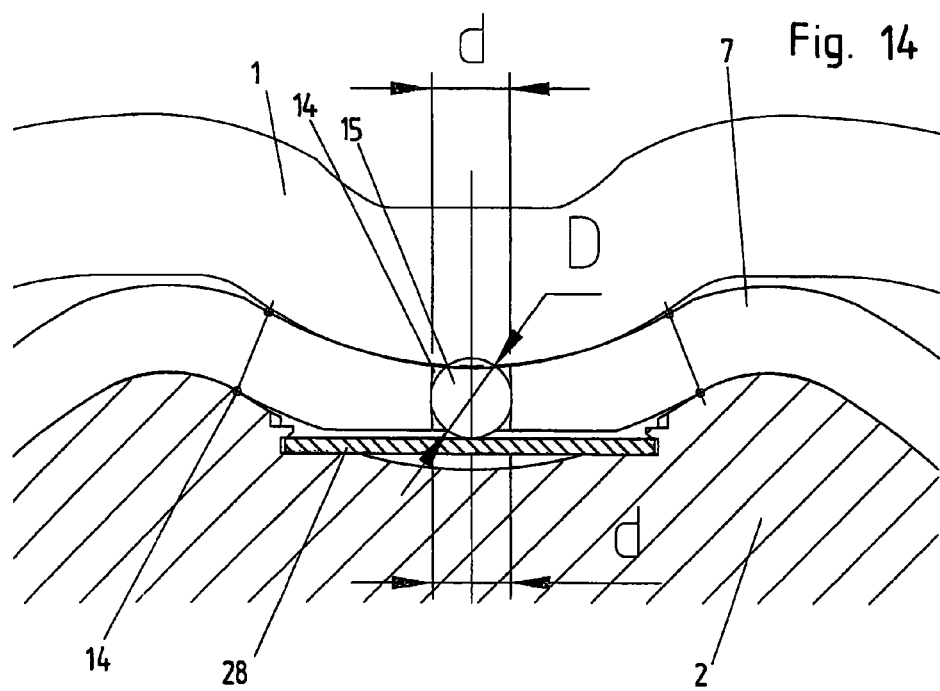
FIG. 14 shows a portion of a cross section through a steering column of a ninth embodiment.

In the embodiment according to FIG. 14, the recesses 14 again extend through the synthetic material of slide sleeve 7. When not under load, the rolling bodies 15 project on both sides from slide sleeve 7. On the side facing the inner profile 2 they are in contact on resilient elements 28, which are secured in the material of the inner profile 2. Other securements of resilient elements 28 in or on the material of the inner profile 2 are also conceivable and feasible. It is further also conceivable and feasible for the spring-resilient elements to be only placed between the inner profile 2 and the slide sleeve 7 without being secured in place on inner profile 2 or on slide sleeve 7.

The spherical rolling bodies depicted in the embodiment examples preferably have diameters in the range between 0.5 mm and 4 mm. Other rolling bodies, for example cylindrical rollers, which preferably are within this diameter range, are also fundamentally utilizable as rolling bodies.

In all described embodiment example, the protrusion a of the rolling bodies with respect to the slide sleeve 7 under no-load condition (=free condition of slide sleeve) is preferably in the range between 0.02 mm and 0.3 mm, wherein a range between 0.08 mm and 0.12 mm is especially preferred.

If the rolling bodies 15 rest on resilient elements 25, 28, as has been described by example for some embodiment examples, these resilient elements 25, 28 are preferably comprised of a resilient metal. Such resilient elements 25, 28 can advantageously be provided with a slide coating for friction reduction with respect to the rolling bodies 15 or bear a slide material on which rest the rolling bodies 15.

If between profiles 1, 2 there is no active torque, a longitudinal displacement between the profiles 1, 2 takes place in all embodiment examples via the rolling bodies 15 in contact on the raceways of outer profile 1, thus a rolling bearing of outer profile 1 is formed with respect to slide sleeve 7. The same applies in the case of an active torque below a limit value, for example of 6 Nm. If the active torque reaches or exceeds the limit value, the longitudinal guidance takes place through a slide bearing between slide sleeve 7 and outer profile 1.

The rolling bodies 15, prestressed against the longitudinally displaceable profile, act in the sense of a centering, at least with respect to the longitudinal axes of profiles 1, 2 and slide sleeve 7, preferably also with respect to the rotational position between the profile 2, holding the slide sleeve 7 nondisplaceably in the longitudinal direction, and the longitudinally displaceable profile 1.

It is also conceivable and feasible to connect the slide sleeve 7 with the outer profile 1 such that it is nondisplaceable in the longitudinal direction. The rolling bodies 15 would in this case cooperate with the outer surface 24 of inner profile 2. In this case, the several embodiment variants described previously would also be utilizable in appropriately adapted form.

Between outer profile 1 and inner profile 2, two or more slide sleeves 7, one adjoining the other in the longitudinal direction or spaced apart, could also be disposed.

In the depicted embodiment examples the inner profile 2, viewed in cross section, comprises in the circumferential direction four torque-transmitting elevations, which cooperate with corresponding contours of the outer profile (via slide sleeve 7 or the rolling bodies 15). In the circumferential direction, for example, three or two or more than four elevations could also be provided. Independently of the number of elevations, these are preferably spaced apart in the circumferential direction from one another by identical angles and the profiles 1, 2 are advantageously symmetrical by such an angle with respect to a particular torsion.

Various modifications of the depicted embodiments are conceivable and feasible, for example with respect to the development of the convex and concave sections 9, 10, 12, 13 of profiles 1, 2. At least some of the convex sections 13 of outer profile 1 are disposed opposite the concave sections 9 of inner profile 2, and/or some of the concave sections 12 of outer profile 1 opposite the convex sections 10 of the inner profile 2 in circumferential regions at least partially overlap.

LEGEND TO THE REFERENCE NUMBERS

1 Outer profile
2 Inner profile
3 Longitudinal axis
4 Formed piece
5 Formed piece
6 Gap space
7 Slide sleeve
8 Groove
9 Concave section
10 Convex section
11 Transition point
12 Concave section
13 Convex section
14 Recess
15 Rolling body
16 Inner surface
17 Outer surface
18 Axis
19 Axis
20 Normal
21 Inner surface
22 Indentation
23 Bottom
24 Outer surface
25 Resilient element
26 Insert part
27 Spring arm
28 Resilient element
29 Apex
30 Stop

The invention claimed is:

1. A variable length steering spindle for a steering mechanism of a motor vehicle, the steering spindle comprising:
an outer sleeve with a non-circular cross section having a hollow volume and an inner circumferential contour, the inner circumferential contour having arcuate sections;
an inner member with a non-circular cross section and an outer circumferential contour, the outer circumferential contour having arcuate sections;
a slide sleeve disposed in a gap space between the outer sleeve and the inner member, the slide sleeve having recesses on one side thereof; and
rolling bodies disposed in the recesses of the slide sleeve,
wherein the slide sleeve is held by one of the outer sleeve and the inner member and is torsion tight and nondisplaceable in a longitudinal direction with respect to the one of the outer sleeve and the inner member, and the slide sleeve is displaceable in the longitudinal direction with respect to the other of the outer sleeve and the inner member,
wherein the recesses and the rolling bodies are disposed on the side of the slide sleeve which faces the other of the outer sleeve and the inner member,
wherein the arcuate sections of the inner circumferential contour of the outer sleeve form alternating convex sections and concave sections, wherein the arcuate sections of the outer circumferential contour of the inner member form alternating convex sections and concave sections, wherein the convex sections of the outer circumferential contour of the inner member are at least partially opposed to the concave sections of the inner circumferential contour of the outer member, and the concave sections of the outer circumferential contour of the inner member are at least partially opposed to the convex sections of the inner circumferential contour of the outer member, wherein the other of the outer sleeve and the inner member has a surface forming a raceway face, wherein the recesses and the rolling bodies are configured such that the rolling bodies project from the slide sleeve in a no-load state of the slide sleeve, and in an assembled state of the steering spindle the rolling bodies are pre-stressed against the raceway face and are displaced in a direction away from the raceway face against a reset force, wherein the slide sleeve contacts the other of the outer sleeve and the inner member when a limit value of torque is exceeded, and wherein the rolling bodies are non-displaceable in the longitudinal direction with respect to the slide sleeve or are finitely displaceable between stops formed at distal ends of the recesses.

2. The steering spindle of claim 1, wherein the rolling bodies are spaced apart from the one of the outer sleeve and the inner member.

3. The steering spindle of claim 1, wherein the recesses are pocket holes.

4. The steering spindle of claim 1, wherein the reset force for the rolling bodies is effected by a force of the material of the slide sleeve counteracting a form change of the slide sleeve.

5. The steering spindle of claim 1, further comprising resilient elements, wherein the slide sleeve is made of synthetic material, and wherein the recesses extend through the synthetic material of the slide sleeve and the rolling bodies rest on the resilient elements which effect the reset force.

6. The steering spindle of claim 5, wherein the resilient elements are secured in place in or on the synthetic material of the slide sleeve.

7. The steering spindle of claim 5, wherein the resilient elements are placed into or are secured in place on or in the one of the outer sleeve and the inner member such that it is non-displaceable in the longitudinal direction.

8. The steering spindle of claim 1, wherein at least one of the rolling bodies is spaced apart from an apex of one of the convex sections of the inner circumferential contour outer sleeve in the circumferential direction.

9. The steering spindle of claim 1, wherein two of the rolling bodies are spaced apart from and disposed on either side of an apex of one of the convex sections of the inner circumferential contour outer sleeve in the circumferential direction, and wherein the distances from the respective rolling bodies to the apex are the same.

10. The steering spindle of claim 1, wherein the rolling bodies are disposed at apexes of the convex sections of the inner circumferential contour outer sleeve.

11. The steering spindle of claim 1, wherein in each instance at least two rolling bodies spaced apart in the longitudinal direction are located at the same circumferential locus of the slide sleeve.

12. The steering spindle of claim 1, wherein the outer circumferential contour of the inner profile and the inner circumferential contour of the outer profile are developed at least sectionwise and approximately correspondingly to one another.

13. The steering spindle of claim 1, wherein only one of the rolling bodies is disposed in each of the recesses.

14. The steering spindle of claim 1, wherein in some or all recesses more than one rolling body is disposed.

15. The steering spindle of claim 1, wherein the rolling bodies are non-displaceable in the longitudinal direction with respect to the slide sleeve.

16. The steering spindle of claim 1, wherein the rolling bodies are finitely displaceable between stops formed at distal ends of the recesses.

* * * * *